(12) United States Patent
Yu (10) Patent No.: US 9,755,488 B2
(45) Date of Patent: Sep. 5, 2017

(54) STATOR CORE WITH A STRUCTURE TO IMPROVE ASSEMBLY CHARACTERISTICS

(71) Applicant: LG Innotek Co., Ltd., Seoul (KR)

(72) Inventor: Byeongjong Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/247,312

(22) Filed: Aug. 25, 2016

(65) Prior Publication Data
US 2016/0365778 A1    Dec. 15, 2016

Related U.S. Application Data

(63) Continuation of application No. 13/567,835, filed on Aug. 6, 2012, now Pat. No. 9,473,005.

(30) Foreign Application Priority Data

Oct. 20, 2011    (KR) .......................... 10-2011-0107389

(51) Int. Cl.
*H02K 1/06*    (2006.01)
*H02K 1/04*    (2006.01)
(Continued)

(52) U.S. Cl.
CPC ........... *H02K 15/022* (2013.01); *H02K 1/148* (2013.01); *H02K 3/345* (2013.01)

(58) Field of Classification Search
CPC .................................. H02K 1/28; H02K 3/34
(Continued)

(56) References Cited

U.S. PATENT DOCUMENTS 2,502,185 A * 3/1950 Thomas ................. H02K 1/185
                                                          310/216.032
4,366,198 A * 12/1982 Ramspacher, Jr. .. H05K 3/0052
                                                          174/254

(Continued)

FOREIGN PATENT DOCUMENTS

JP          H06-9349 U    2/1994
JP          07067273 A    3/1995
(Continued)

OTHER PUBLICATIONS

Office Action dated Jul. 15, 2016 in Japanese Application No. 2012-190992.
(Continued)

*Primary Examiner* — Jose Gonzalez Quinones
(74) *Attorney, Agent, or Firm* — Saliwanchik, Lloyd & Eisenschenk (57) ABSTRACT

Disclosed stator core for motor is comprising: more than one stator core body; a fixing unit, which is arranged at both ends of the stator core body and fixes the stator core body to be a cylindrical shape; a first insulator, which is integrally formed by mold in order to wrap a part of the stator core body and a side surface of plural teeth simultaneously; and a second insulator, which is arranged to have a form corresponding to the first insulator, and which is integrally formed by mold in order to wrap a part of the stator core body and a side surface of plural teeth simultaneously through the assembly with the first insulator, wherein the first simulator and the second simulator are separated from each other by the section wrapping the teeth during the bending process of the stator core body.

15 Claims, 8 Drawing Sheets

(51) Int. Cl.
*H02K 15/02* (2006.01)
*H02K 1/14* (2006.01)
*H02K 3/34* (2006.01)

(58) Field of Classification Search
USPC ............ 310/43, 216.008, 216.009, 216.049, 310/216.066, 216.067, 216.109, 216.114, 310/216.115, 216.135
See application file for complete search history.

(56) References Cited

U.S. PATENT DOCUMENTS

2005/0067912 A1 3/2005 Murakami et al.
2009/0284096 A1* 11/2009 Katagiri ................ H02K 1/148
 310/216.001

FOREIGN PATENT DOCUMENTS

| JP | H10271718 A | 10/1998 |
|---|---|---|
| JP | 2000014057 A | 1/2000 |
| JP | 3017085 B2 | 3/2000 |
| JP | 2000078789 A | 3/2000 |
| JP | 2001045684 A | 2/2001 |
| JP | 2001136700 A | 5/2001 |
| JP | 2001211574 A | 8/2001 |
| JP | 2003324870 A | 11/2003 |
| JP | 2007143257 A | 6/2007 |
| JP | 2007151312 A | 6/2007 |
| JP | 2007288852 A * | 11/2007 |
| JP | 2007288852 A | 11/2007 |
| JP | 2011019360 A | 1/2011 |

OTHER PUBLICATIONS

Office Action dated Jul. 27, 2015 in U.S. Appl. No. 13/567,835.
Office Action dated Jan. 29, 2016 in U.S. Appl. No. 13/567,835.
European Search Report dated May 31, 2017 in European Application No. 12179366.5.

* cited by examiner

STATOR CORE WITH A STRUCTURE TO IMPROVE ASSEMBLY CHARACTERISTICS

CROSS-REFERENCE TO RELATED APPLICATION

This application is a continuation of U.S. application Ser. No. 13/567,835, filed Aug. 6, 2012, which claims the benefit under 35 U.S.C. §119 of Korean Patent Application No. 10-2011-0107389, filed Oct. 20, 2011, which are herein incorporated by reference in their entirety.

BACKGROUND

Field of the Invention

The present invention relates stator core for motor and manufacturing method thereof.

Description of the Related Art

Generally, stator core for motor is formed by coiling plural teeth protruded from an inner circumferential surface after a metal core body is configured as a cylindrical shape.

Recently the stator core needs a miniaturization and weight lightening according to a miniaturization of motor, thus a forming the stator core by laminating a thin metal plate with constant thickness or forming the cylindrical shaped stator core by combining a roughly "T" shaped a split core having one teeth is more often used than a conventional forming method using the stator core of one body.

But for the laminating stator core, there is a complication that plural metal plates undergo press working with the same configuration, and then the laminating process should be done separately. Further for the split core, there is a complication that stator core should be formed as a cylindrical shape by a fitting combination for the connecting part of split core using an extra adhesion or arranging a complementary shape due to an air gap in a assembly position for each split core during a combination process of a cylindrical shaped stator core by combination of each split core after each split core is formed by molding or sintering.

Recently for the solution of the described complication, the art which assembles more than one laminated unit core with completion of bending after laminating plural unit core and bending laminated unit core simultaneously, to be ring shaped stator core is stated in the Korean Patent No. 2008-0078944, released on Aug. 29, 2008.

But according to this composition, product defects by the separation of core assembly are mostly likely to occur in a assembly process of stator core after bending, and also there is a problem that if the assembled parts are not firmly fixed, the efficiency for motor can fall or poor performance can occur.

BRIEF SUMMARY

Accordingly, an object of the present invention is to provide the stator core for motor, which has improved structure in order to compose a cylindrical stator core by rolling one integrally formed body, and firmly compose an assembly structure in the assembly units facing each other.

The stator core for motor by the present invention comprises that more than one stator core body, which is formed as one body by mold for plural teeth to be formed protrusively at regular interval in the same direction, and is formed as cylindrical shape in which both ends are combined by bending process for a designed section of right and left around the teeth; a fixing unit, which is arranged at both ends of the stator core body and fixes the stator core body to be a cylindrical shape; a first insulator, which is integrally formed by mold in order to wrap a part of the stator core body and a side surface of plural teeth simultaneously; and a second insulator, which is arranged to have a form corresponding to the first insulator, and which is integrally formed by mold in order to wrap a part of the stator core body and a side surface of plural teeth simultaneously through the assembly with the first insulator, wherein the first simulator and the second simulator are separated from each other by the section wrapping the teeth during the bending process of the stator core body.

Preferably, but not necessarily, the first insulator and the second insulator have the bottleneck having within 0.5 mm thickness nearby the position of the bending section of the stator core body, and the bottleneck is fractured by fatigue during the bending process of the stator core body.

Preferably, but not necessarily, the fixing unit comprises a fixing protrusion, which is protrusively formed at one side end of the stator core body; and a fixing groove, which is concavely formed as complementary shape to the fixing protrusion at the other end of the stator core body.

Further, the fixing unit comprises a pin groove, which is formed at both ends of the stator core body; and a fixing pin, which is fitted adjustably to the pin groove. The pin groove comprises more than two hitching units; and an opening unit connected with the hitching unit, and can inhibit the fixing pin from being separated in the perpendicular direction to the direction of which the fixing pin is inserted and assembled in the pin groove, herein the pin groove is arranged as a "T" shape, and the fixing pin fixedly inserted in a pair of the pin groove is arranged as a "H" shape.

Preferably, but not necessarily, each corner of the fixing pin and pin groove are rounded, and the fixing pin is arranged as same thickness with the stator core body.

Preferably, but not necessarily, the stator core body has a hook unit having complementary shape around the protrusion of the adjacent teeth in order to maintain a cylindrical shape in the bending process.

Preferably, but not necessarily, the hook unit has the rounded edge of which the concavo and convex structure interlocked with each other, and the gapped groove is formed at the position nearby the hook unit to reduce an interference effect during the bending of stator core body.

According to an exemplary embodiment of the present disclosure, the manufacturing method of stator core for motor comprises a stage of injection molding for more than one stator core body, which is formed as one body by mold for plural teeth to be formed protrusively at regular interval in the same direction, and is formed as cylindrical shape in which both ends are combined by bending process for a designed section of right and left around the teeth; a stage of injection molding for a first insulator, which is integrally formed by mold in order to wrap a part of the stator core body and a side surface of plural teeth simultaneously, and for a second insulator, which is arranged to have a form corresponding to the first insulator, and which is integrally formed by mold in order to wrap a part of the stator core body and a side surface of plural teeth simultaneously through the assembly with the first insulator; a stage of assembly for the molded stator core body, the first insulator, and the second insulator in a linear condition; a stage of coiling around the teeth insulated by the first insulator and the second insulator; a stage of fixing the coiled stator core body, the first insulator, and the second insulator by using the fixing unit arranged at the both ends of the stator core body after bending the coiled stator core body, the first insulator, and the second insulator as a circular shape.

The stage of bending further comprises a stage of fixing for every teeth by the section successively through the hook unit, which is configured nearby the stator core body, and has complementary shape around the protrusion of the adjacent teeth.

The stage of coiling comprises a stage of coiling the teeth in order to maintain the constant distance between the coils wound around the teeth of stator core body having a cylindrical shape by the bending process.

Preferably, but not necessarily, the manufacturing method of stator core for motor comprises a stage of forming a cylindrical shaped stator core by assembly with another stator core module formed from the equal process, if the stator core module formed by the assembly and bending of the stator core body, the first insulator, and the second insulator, has a semicircular shape.

The advantage according to the present invention is that the fixing ability and assembly efficiency can be improved because the reliability of assembly part of stator core made by rolling one integrally formed body is improved.

Further, the combination and transportation for motor is easy and the loss of working following combination error of core unit can be reduced because the air gap of each split cores is minimized during the combination of stator core.

DETAILED DESCRIPTION

Hereinafter, the stator core for motor and manufacturing method thereof will be described in detail with reference to the accompanying drawings.

Figure 1:
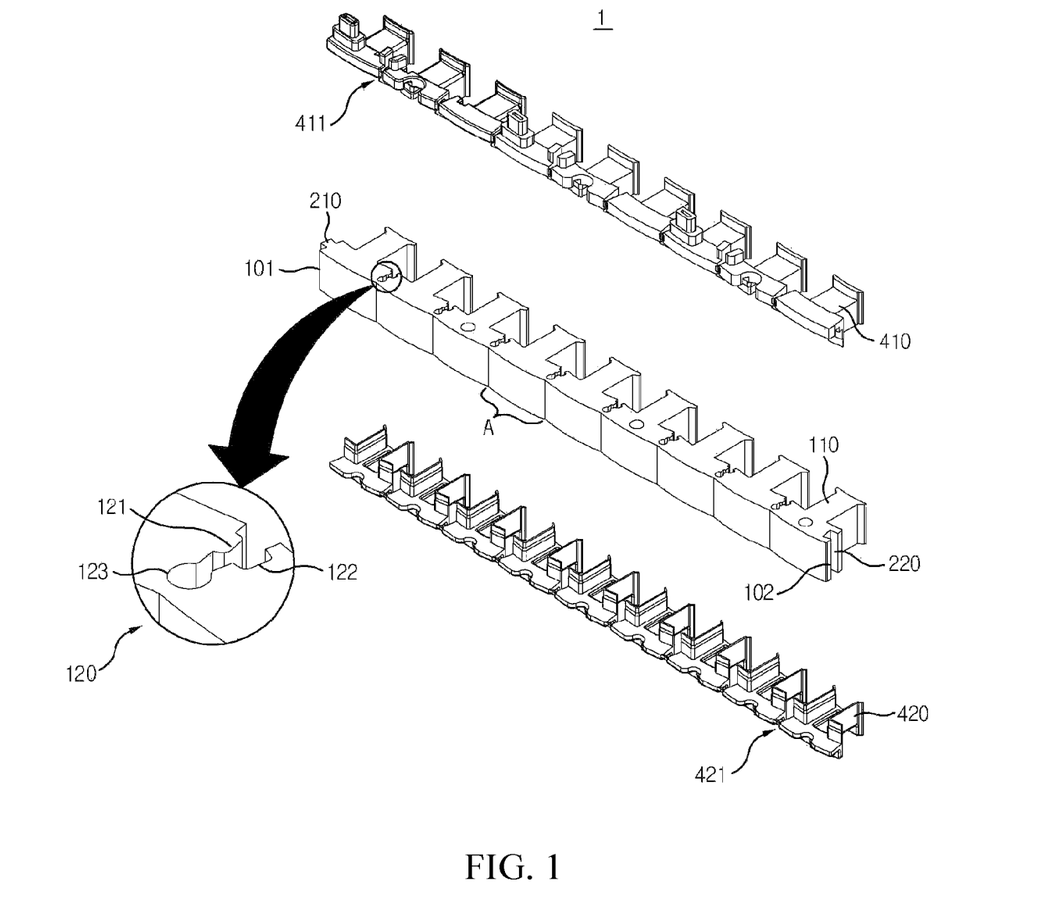
FIG. 1 is an exploded perspective view illustrating the stator core, the first insulator and the second insulator. The stator core is formed in a mold and assembled, further, has a state before bending.
Figure 2:
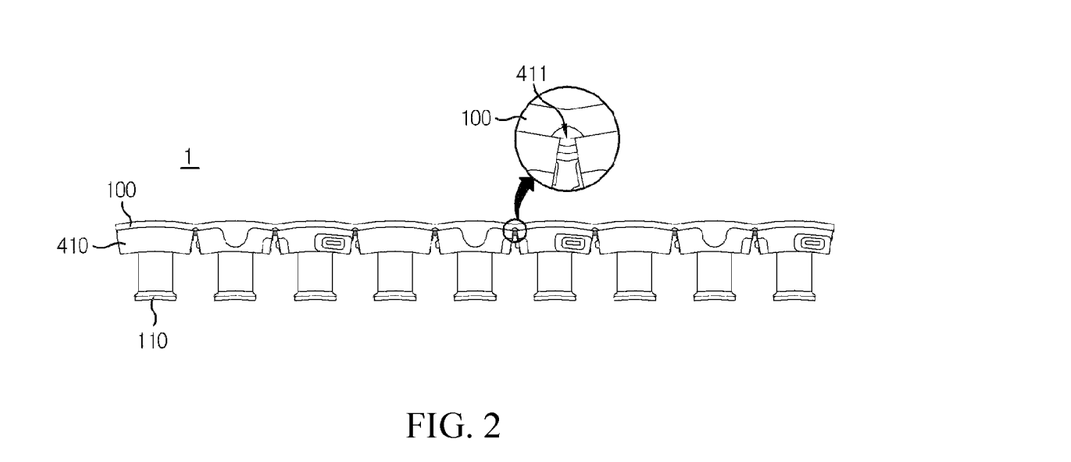
FIG. 2 is an assembly view of FIG. 1.
Figure 3:
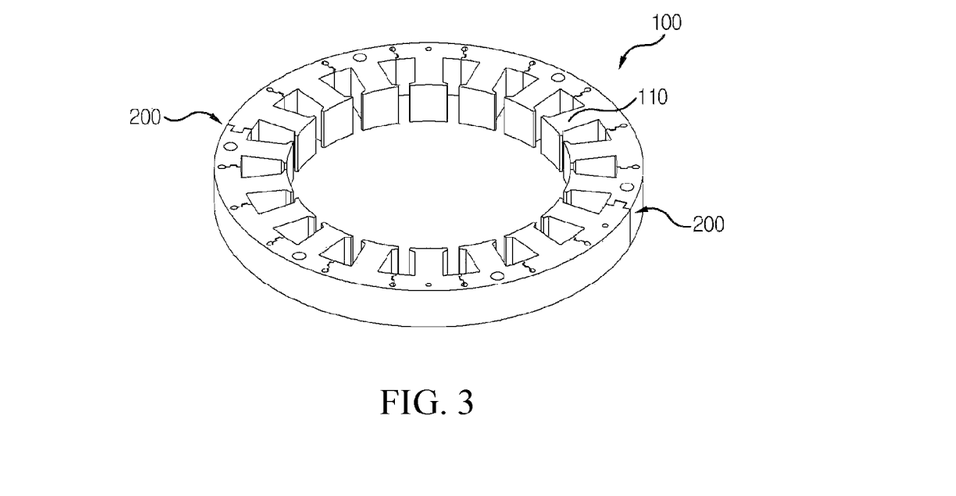
FIG. 3 is a perspective view illustrating the stator core of FIG. 1, which is bended and is cylindrically rolled, and as a fixing unit according to the first exemplary embodiment of the present disclosure.
Figure 4:
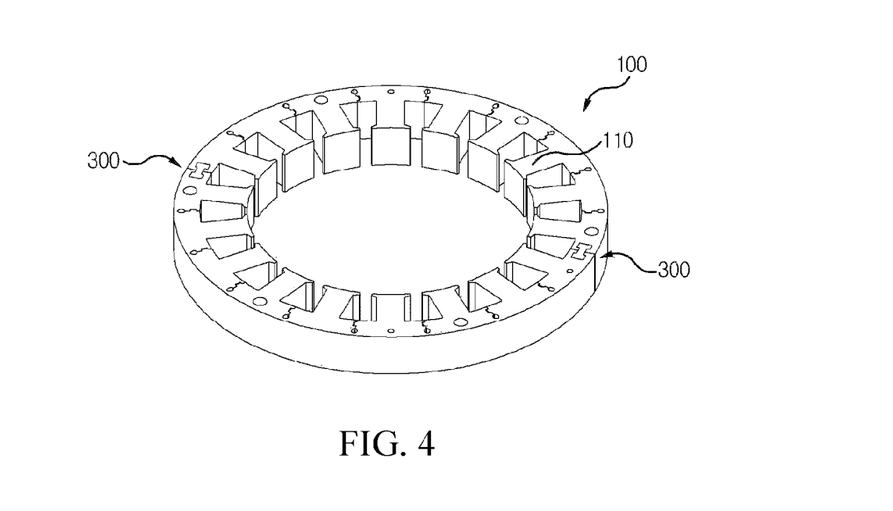
FIG. 4 is a perspective view illustrating the stator core of FIG. 1, which is bended and is cylindrically rolled, and as a fixing unit according to the second exemplary embodiment of the present disclosure.
Figure 5:
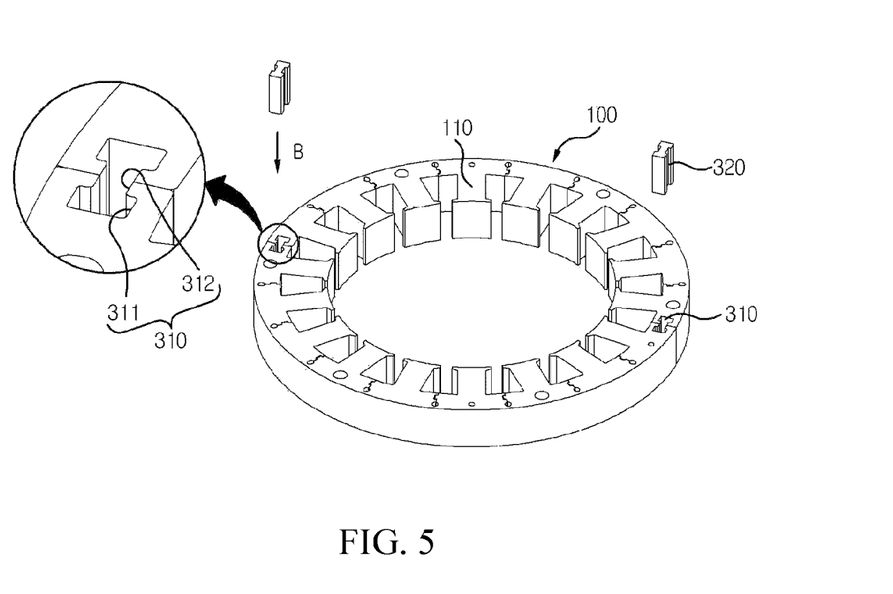
FIG. 5 is a perspective view illustrating the stator core module of FIG. 1, which is bended and is cylindrically rolled.
Figure 6:
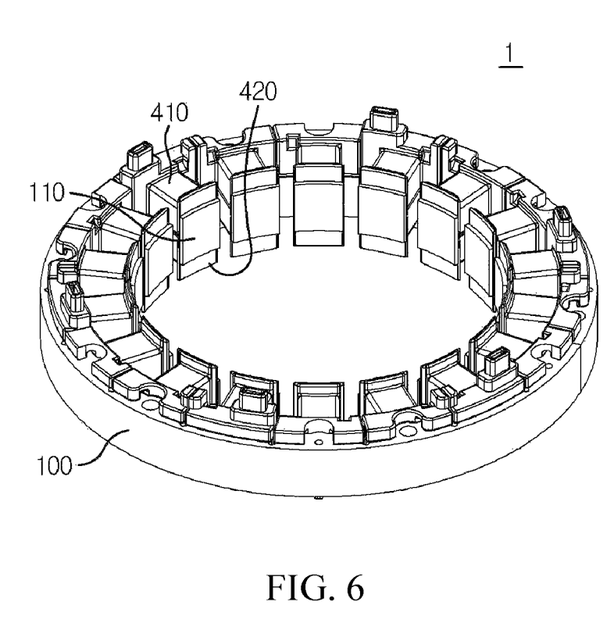
FIG. 6 is a perspective view of the stator core module according to an exemplary embodiment of the present disclosure.
Figure 7:
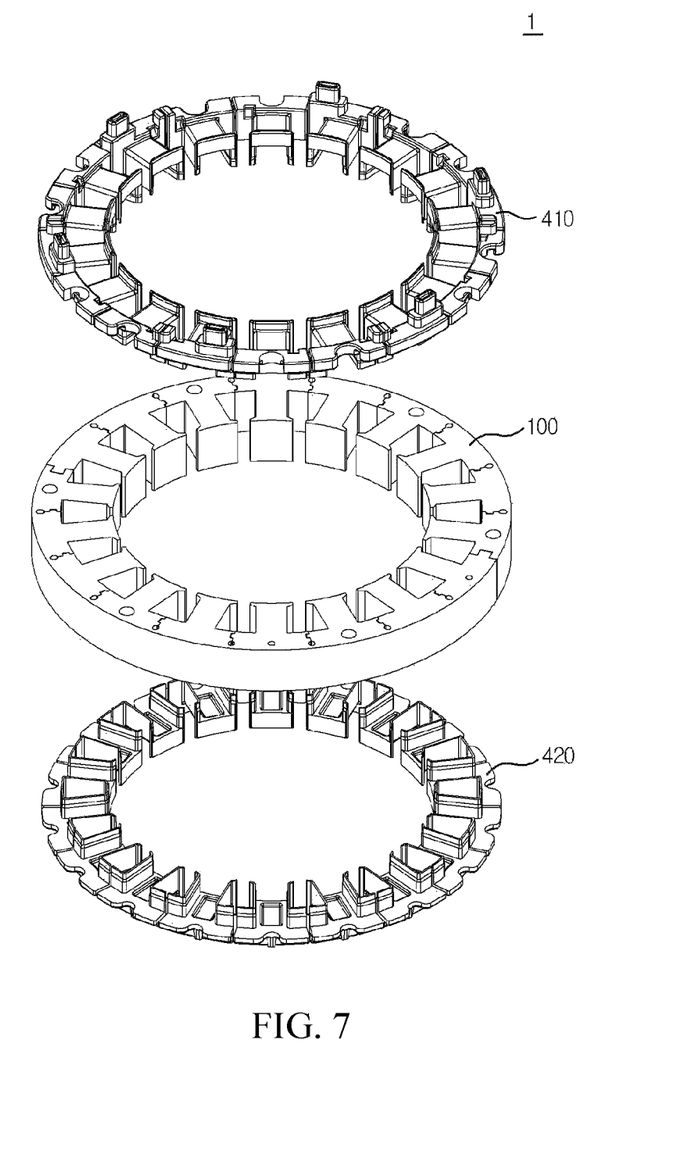
FIG. 7 is an exploded perspective view of FIG. 6.

FIG. 1 is an exploded perspective view illustrating the stator core, the first insulator and the second insulator, and the stator core is formed in a mold and assembled, further, has a state before bending, FIG. 2 is an assembly view of FIG. 1, FIG. 3 is a perspective view illustrating the stator core of FIG. 1, which is bended and is cylindrically rolled, and as a fixing unit according to the first exemplary embodiment of the present disclosure, FIG. 4 is a perspective view illustrating the stator core of FIG. 1, which is bended and is cylindrically rolled, and as a fixing unit according to the second exemplary embodiment of the present disclosure, FIG. 5 is a perspective view illustrating the stator core module of FIG. 1, which is bended and is cylindrically rolled, FIG. 6 is an enlarged view of the teeth for stator core module in FIG. 5.

As shown in FIG. 1 or FIG. 4, the stator core of the present invention comprises the stator core module (1) composed of assembly with the stator core body (100), the first insulator (410), and the second insulator (420), and wound by the coil (C, referring FIG. 8), and further comprises the fixing units (200) (300) for fixing the bended stator core body (100) as a circular shape.

The stator core body (100) is formed as one body by mold for plural teeth (110) to be formed protrusively at regular interval in the same direction. Preferably, but not necessarily, the stator core body (100) is formed as cylindrical shape in which both ends (101) (102) are combined by bending process for a designed section (A) of right and left around the teeth (110) as shown in FIG. 2.

Preferably, but not necessarily, the stator core body (100) has a hook unit (120) having complementary shape around the protrusion of the adjacent teeth (110) in order to maintain a cylindrical shape in the bending process.

The hook unit (120) has a concavo and convex structure interlocked with each other. The hook protrusion (121) is formed at the one end, and the receptive groove (122) is formed at the other end of the hook unit (120). Preferably, but not necessarily, the edges of the hook protrusion (121) and the receptive groove (122) are rounded for smooth combination.

Further, the gapped groove (123) is formed at the position nearby the hook unit (12) to reduce an interference effect of each designed section (A) during the bending of stator core body (100). Preferably, but not necessarily, the gapped groove (123), as shown in FIG. 1, has a trench structure having a roughly circular cross section and one end is opened thus this opened end is connected with the hook unit (120).

According to the first exemplary embodiment of the present disclosure, the fixing unit (200), as shown in FIG. 3, is formed at the both ends of the stator core body (100) in order to fix the stator core body (100) as a cylindrical shape, and comprises the fixing protrusion (210) and the fixing groove (220).

The fixing protrusion (210) is protrusively formed at the one end (101) of the stator core body (100), and is formed to have a roughly square cross section as shown, but it is not limited to the square cross section, further the cross section can have a circular or polygonal shape even though those are not shown. The fixing protrusion (210) can have whatever structures if the fixing protrusion (210) is hooked in the separation direction of the fixing groove (220).

The fixing groove (220) is concavely formed as a complementary shape to the fixing protrusion (210) at the other end (102) of the stator core body (100).

According to the first exemplary embodiment of the present disclosure, the fixing unit (200) configured in the same manner as above, is fixed by a sliding-fit assembly of the fixing protrusion (210) and the fixing groove (200), and the fixing unit (200) fixes the stator core body (100) as a cylindrical shape by press-in process of minimizing a tolerance between the fixing protrusion (210) and the fixing groove (200).

According to the second exemplary embodiment of the present disclosure, the fixing unit (300) comprises, as shown in FIG. 4 and FIG. 5, a pin groove (310) and a fixing pin (320).

The pin groove (310) is formed at both ends of the stator core body (100), as shown, and comprises more than two hitching units (311) and an opening unit (312) connected with the hitching unit (311), and inhibits the fixing pin (320) from being separated in the perpendicular direction to the direction (Arrow B direction in FIG. 5) of which the fixing pin (320) is inserted and assembled in the pin groove (310).

According to an exemplary embodiment of the present disclosure, preferably, but not necessarily, the pin groove (310) is installed to have a mutually symmetrical shape at the both ends (101) (102) (Referring FIG. 1) of the stator core body (100).

The fixing pin (320) has a complementary shape to a shape of the pin groove (310) to be inserted and assembled in the pin groove (310). Preferably, but not necessarily, the fixing pin (320) has a bilateral symmetrical shape because the pin groove (310) located at the both ends (101) (102) of the stator core body (100) has a mutually symmetrical shape. The fixing pin (320) is pressed and assembled in the parallel direction to the arrow B direction of FIG. 6.

According to an exemplary embodiment of the present disclosure, the pin groove (310) is arranged as a "T" shape, and the fixing pin (320) fixedly inserted in a pair of the pin groove (310) is arranged as a "H" shape, but it is not limited to the described shapes, further the shapes can have whatever shapes if the shape can inhibit the separation in the perpendicular direction to the described arrow B direction.

Further preferably, but not necessarily, each corner of the pin groove (310) and the fixing pin (320) are rounded, and are arranged as same thickness with the stator core body (100).

By means of the fixing unit (300) using the fixing pin (320), the combination and transportation for motor is easy and the loss of working following combination error of core unit can be reduced because the air gap of each split cores is minimized during the combination of stator core.

The first insulator (410) and the second insulator (420), as shown in FIG. 1, FIG. 2, FIG. 7, and FIG. 8, are connected at the upper and the lower of the stator core body (100), and inhibit a current flowing in the coil (C) wound in the teeth (110) from being transmitted to the stator core body (100).

The first insulator (410) and the second insulator (420) are arranged as mutually complementary shapes, and assembled with the stator core body (100) at the same time. Preferably, but not necessarily, for the above described assembly, the first insulator (410) and the second insulator (420), as shown in FIG. 1 and FIG. 2, are formed as one body having a line shape by injection molding.

Preferably, but not necessarily, the first simulator (410) and the second simulator (420) are arranged to be separated from each other by the section wrapping the teeth (110) during the bending process of the stator core body.

Preferably, but not necessarily, the first insulator (410) and the second insulator (420), as shown in FIG. 1 and FIG. 2, have the bottleneck (411) (421) having within 0.5 mm thickness nearby the position of the bending section of the stator core body (100), and the bottleneck (411) (421) is fractured by fatigue during the bending process of the stator core body (100).

Figure 8:
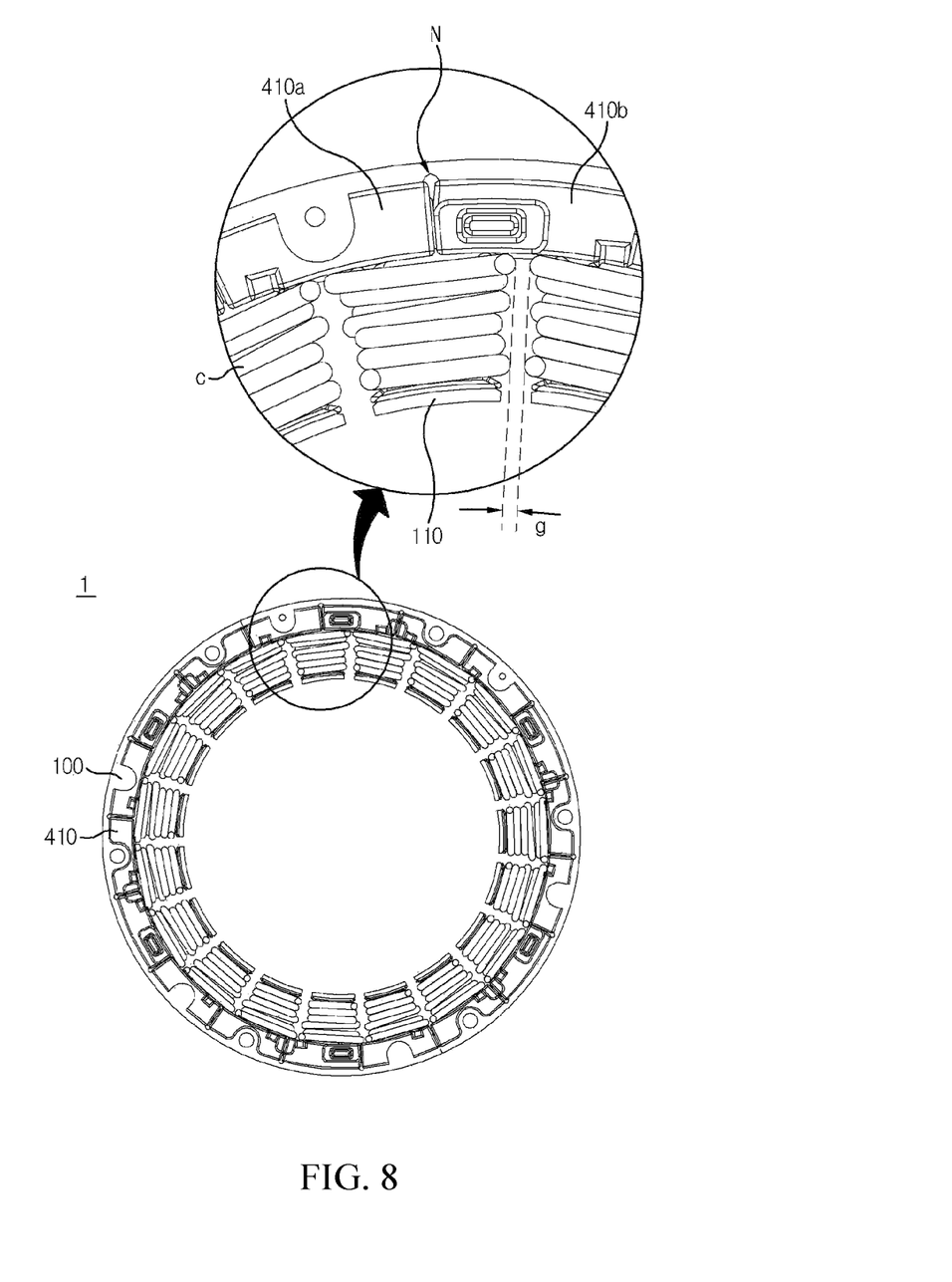
FIG. 8 is a plan view of the stator core of FIG. 6 and an enlarged view of the teeth.
Figure 9:
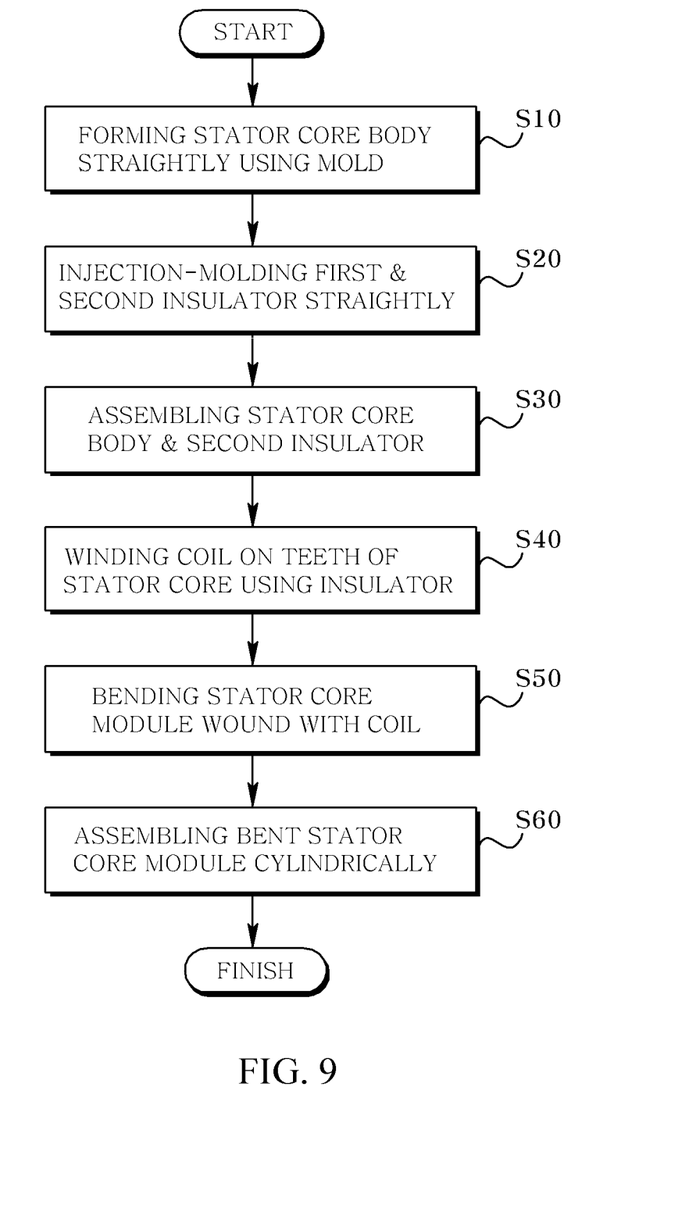
FIG. 9 and FIG. 10 are flow charts illustrating the manufacturing method of the stator core for the motor according to an exemplary embodiment of the present disclosure.
Figure 10:
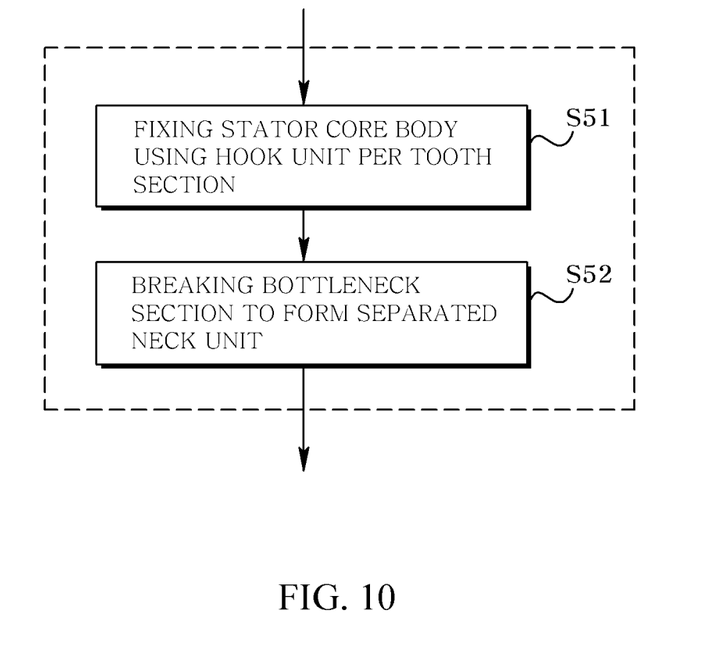

According to the described composition, the first No. 1 insulator (410a) and the second No. 1 insulator (410b), which are attached each other when first created, can form neck unit (N) by separation as shown in FIG. 8 if the stator core module (1) is bended as cylindrical shape.

Hereinafter, the manufacturing method of stator core for motor will be described in detail according to an exemplary embodiment of the present disclosure.

An object of the present invention is to form the stator core body (100), the first insulator (410), and the second insulator (420) as a line shape for the manufacturing of the stator core module (1), and is to form the temporarily assembled stator core module (1), as shown in FIG. 2, by the combination of the stator core body (100), the first insulator (410), and the second insulator (420).

First, one body by mold is formed for plural teeth protrusively at regular interval in the same direction. More than one stator core body, preferably two stator core bodies (100) are formed by injection or sintering as cylindrical shape in which both ends are combined by bending process for a designed section of right and left around the teeth. The opposite surface of the teeth formed is configured to have a circular shape and have an arc shape by a constant interval (S10).

The first insulator (410) and the second insulator (420) are integrally made by injection molding to have complementary shape to each other, and to wrap a part of stator core body (100) and one end surface of the plural teeth (110) simultaneously. Preferably, but necessarily, the first insulator (410) and the second insulator (420) are made of synthetic resins often used as insulating material (S20).

The line-shaped stator core module (1) is formed by the assembly with the stator core body (110), the first insulator (410), and the second insulator (420), which all are formed from the (S10) stage and the (S20) stage, in a line condition which is previous stage of bending.

As a next stage, the coil (C, Referring FIG. 8) is wound on the teeth (110) insulated by the first insulator (410) and the second insulator (420) of the line-shaped stator core module (10) formed from the (S30) stage. Though the described coiling, more simple coiling can be done comparing to a coiling process that coils on the teeth of an integrated stator core of existing. In other words, in order to make a uniform distance (g) (Referring FIG. 8) with the coil on the adjacent teeth (110) after bending, the end of the teeth (110) has a small number of turns, and the other end has a large number of turns. In the pas ways, it is difficult to wind a coil due to a small space between the teeth protruding toward the center because the stator core is already formed as a cylindrical shape. But it is easy to wind a coil as much as wanted by location, if a coil is wound in an unfolded condition as a line-shaped. Further, the space factor of stator core module (1) can be improved because it is possible to make a uniform distance (g) with the coil (C) on the adjacent teeth (110) after bending (S40).

For the stator core module (1) coiled from the (S40) stage, the stator core body (100), the first insulator (410), and the second insulator (420) is fixed by the fixing units (200) (300) arranged ate the both ends of the stator core body after bending the stator core body (100), the first insulator (410), and the second insulator (420) as a circular shape (S50).

The stage of bending further comprises a stage (S51) of fixing for every teeth by the section successively through the hook unit (120), which is configured nearby the stator core body (100), and has complementary shape around the protrusion of the adjacent teeth, and a stage (S52) of forming the separated neck unit (N) (Referring FIG. 8) through the fatigue fracture, which is caused by bending, for the bottleneck (411) (421) of the first insulator (410) and the second insulator (420).

If the stator core module (1), which is formed by the assembly and bending of the stator core body (100), the first insulator (410), and the second insulator (420), is arranged as a semicircular shape, the cylindrical-shaped stator core can be formed by combination with the another stator core module (1) made from the stage of (S10) or (S50). According to an exemplary embodiment of the present disclosure, the cylindrical-shaped stator core body (100) is formed by the combination of the two semicircular-shaped stator core modules (1). But it is not limited to the above described, further it is possible to combine more than two stator core modules (1) as needed. Preferably, but not necessarily, the stator core body (100) is combined by using just one or two stator core module (1) because there is no difference with a conventional combination process using split core if the number of the stator core module (1) increases.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A stator core with a reinforced coupling structure, the stator core comprising:
   a stator core body comprising a plurality of teeth protrusively formed at a predetermined interval;
   a fixing unit provided in a complementary shape at both ends of the stator core body;
   a plurality of hook units each having a complementary shape around a protrusion of the adjacent teeth to maintain a cylindrical shape in a bending process; and
   an insulator comprising a first insulator and a second insulator discretely formed, each of the first and second insulators being integrally formed in a mold to wrap the stator core body and the teeth simultaneously,
   wherein the fixing unit comprises a pin groove formed at both ends of the stator core body and a fixing pin adjustably inserted into the pin groove,
   wherein each of the first and the second insulators comprises a bottleneck formed at a position where each hook unit is disposed, and
   wherein the bottleneck is configured to be fractured to form a separate neck unit by bending the stator core body together with the insulator in the cylindrical shape.

2. The stator core of claim 1, wherein the first and the second insulators each wraps outer surfaces of the stator core body and the teeth simultaneously.

3. The stator core of claim 1, wherein the pin groove comprises:
   a hitching unit; and
   an opening unit connected with the hitching unit.

4. The stator core of claim 1, wherein each corner of the fixing pin and pin groove are rounded.

5. The stator core of claim 1, wherein the fixing pin has the same thickness as the stator core body.

6. The stator core of claim 1, wherein the hook unit has a rounded edge of which a concave and convex structure interlock with each other.

7. The stator core of claim 1, wherein the hook unit comprises a gapped groove to reduce an interference effect during the bending of the stator core body.

8. The stator core of claim 7, wherein the gapped groove has a trench structure having a substantially circular cross section and one end of the gapped groove is opened and connected with the hook unit.

9. The stator core of claim 1, wherein the fixing pin has a bilateral symmetrical shape to be fitted in the fixing groove.

10. The stator core of claim 1, wherein the pin groove is formed in a "T"-shape.

11. The stator core of claim 10, wherein the fixing pin has a cross section of "H" shape and is fixedly inserted in a pair of the pin grooves.

12. The stator core of claim 1, wherein the stator core body is arranged as a semi-circular shape.

13. The stator core of claim 12, wherein the stator core is formed by combination of two semicircular-shaped stator core bodies.

14. An insulator to electrically insulate a stator core, wherein the stator core comprises a stator core body protrusively formed with a plurality of teeth each wrapped by a wire and a hook unit around a protrusion of the adjacent teeth, the insulator comprising:
   a first insulator integrally formed with a first portion to cover one half of outer surfaces of the stator core body and the teeth, and
   a second insulator integrally formed with a second portion to cover the other half of outer surfaces of the stator core body and the teeth,
   wherein the first and the second insulator are discretely formed and integrally formed in a mold to wrap the stator core body and the teeth simultaneously,
   wherein the first and the second insulators each comprises a bottleneck formed at a position corresponding to the hook unit of the stator core, and
   wherein the bottleneck is configured to be fractured to form a separate neck unit by bending the stator core body in a cylindrical shape.

15. The insulator of claim 14, wherein the first and the second insulator are formed in a mutually complementary shape.

* * * * *